May 5, 1964  L. PÉRAS  3,131,678
VALVE GEARS FOR ROTARY-PISTON EXPLOSION ENGINES
Filed Dec. 26, 1961  3 Sheets-Sheet 1

Inventor
Lucien Peras
By Stevens, Davis, Miller & Mosher
Attorneys

United States Patent Office 3,131,678
Patented May 5, 1964

3,131,678
VALVE GEARS FOR ROTARY-PISTON
EXPLOSION ENGINES
Lucien Péras, Billancourt, France, assignor to Regie
Nationale des Usines Renault, Billancourt, France
Filed Dec. 26, 1961, Ser. No. 161,833
Claims priority, application France Dec. 27, 1960
3 Claims. (Cl. 123—8)

This invention relates in general to rotary-piston explosion engines and more particularly to an engine of this type wherein the stator comprises three lobes and the rotor two lobes having an epicyclic contour, the stator contour being conjugated with the rotor contour.

The rotor revolves eccentrically on a crankshaft revolving in turn at a velocity which is twice the rotor speed but in the opposite direction.

The rotor movements within the stator creates working chambers in which the four strokes of the engine cycle take place in succession, each working chamber having associated therewith a combustion chamber in which an exhaust valve, an inlet valve and a spark plug are mounted, the latter causing the air-fuel mixture to explode in the order I—III—II of the chambers.

This invention is concerned more particularly with the valve gear of an engine of this character for ensuring the proper timing of the engine, this timing being obtained in a very simple and economical manner, and having as its chief feature the fact that a single, one-lobe cam is sufficient for operating the inlet and exhaust valves of the three working chambers of the engine.

According to another feature characterizing this invention, although the valve rockers are disposed radially at 120 degrees from each other a cam of the plate is used which actuates cylindrical tappets guided in adequate cavities formed in a fixed case connected to the stator.

With this arrangement a compact and extremely balanced assembly is obtained.

Moreover, this invention provides in a rotary engine having three working chambers of this type a valve gear arrangement whereby the opening of the inlet valves and the closing of the exhaust valves of two adjacent working chambers are caused to take place simultaneously; thus, the inlet valve of one chamber and the exhaust valve of an adjacent chamber may be controlled simultaneously.

These different arrangements combined together and applied to a rotary piston engine provide a particularly simple and economical construction, especially in the case of mass production.

The invention will be better understood from the following description of a typical embodiment thereof given by way of example with reference to the accompanying drawings, wherein.

Figure 1:
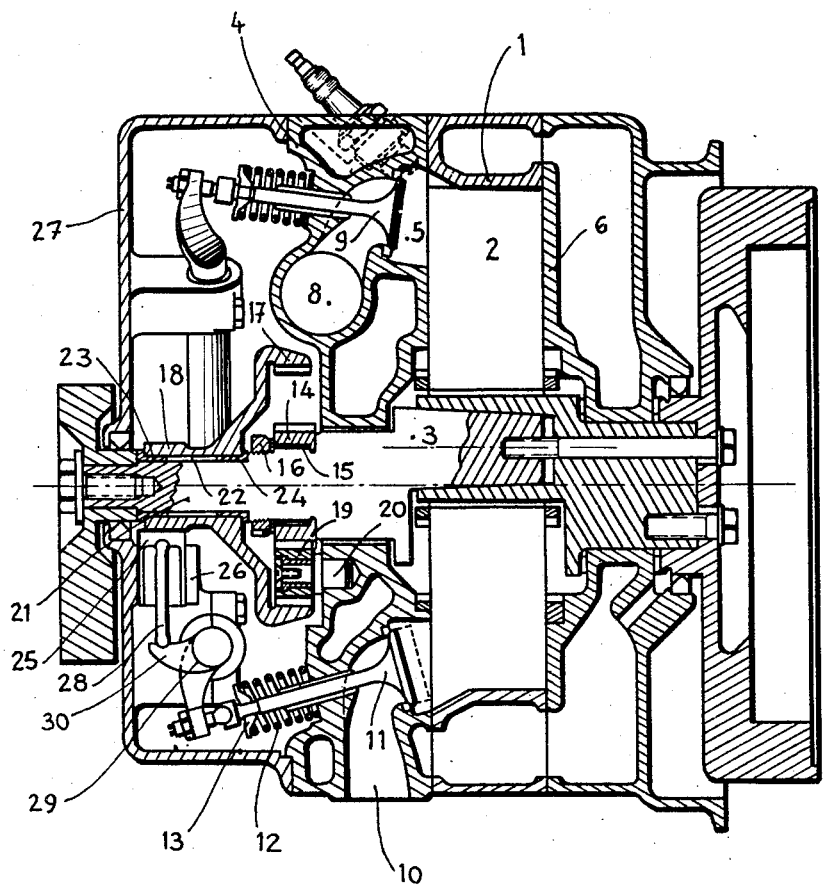
FIGURE 1 is a longitudinal section showing a rotary-piston explosion engine constructed according to the teachings of this invention.

Referring now to FIG. 1 it will be seen that the rotary-piston explosion engine of this invention comprises a stator 1, a rotor 2, a crankshaft 3, and a case member 4 constituting a circular cylinder-head in which the combustion chambers 5 are formed.

Figure 4:
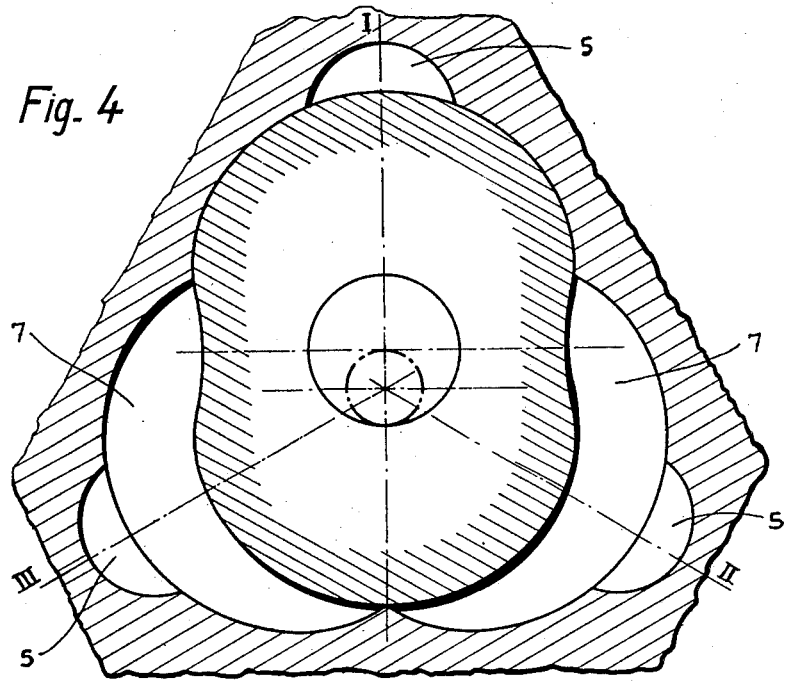
FIGURE 4 is a diagram showing the top dead centres and bottom dead centres of the engine.
Figure 5:
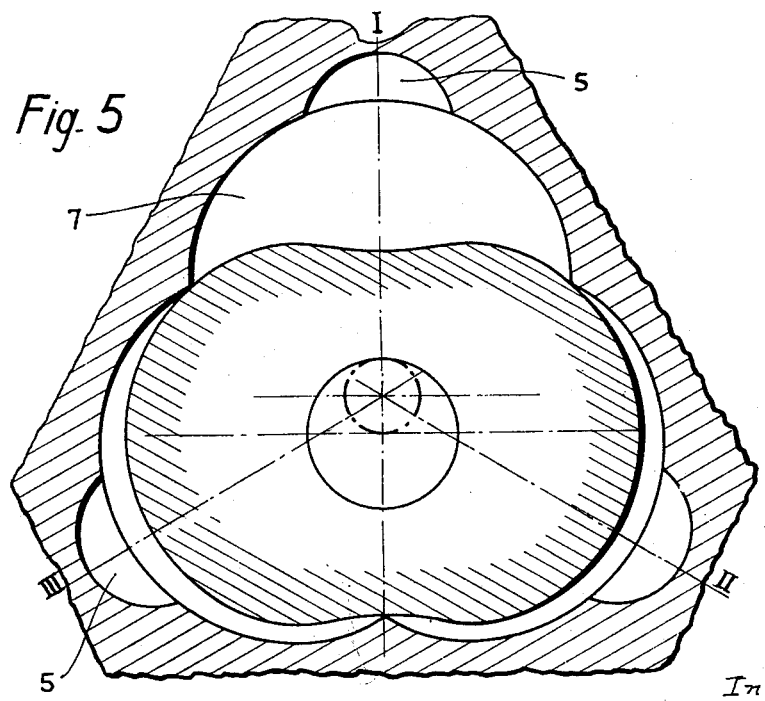
FIGURE 5 is a diagram similar to FIG. 4 but showing the rotor in a different position.

Another case member 6 opposite to case member 4 closes the working chambers 7 (see FIGS. 4 and 5) associated with the combustion chambers 5.

A semi-circular inlet passage 8 is formed in case member 4 for introducing the air-fuel mixture into combustion chambers 5 through ports controlled by inlet valves such as 9. An exhaust passage 10 is also formed in this case member for discharging the burnt gas through ports controlled by exhaust valves such as 11 (in FIG. 2 the inlet valves are designated by the reference letter A and the exhaust valves by the reference letter E).

Each valve is provided with return means such as a valve spring 12 and a valve spring retainer 13.

The valve gear is driven through a toothed sun gear 14 mounted by means of splines 15 of relatively small dimensions on the crankshaft 3; a lock nut 16 is screwed on the crankshaft 3.

Assuming that a complete four-stroke cycle of the engine is obtained for a complete rotation of the rotor and the ignition order is I—III—II (which is also the order of opening of the valves of same character), the timing cam must be driven at an angular speed which is half the crankshaft speed which, as already explained, revolves at twice the rotor speed; as the crankshaft revolves in a direction opposite to that of the engine rotor, it is necessary to reverse the direction of rotation of the timing cam. To this end, a differential or epicyclic train of gears is used which comprises an internally toothed annulus 17 rigid with the single cam 18, and planet wheels 19 mounted on fixed pins such as 20 force fitted in the case member 4.

The annulus 17 and cam 18 are mounted for loose rotation on one end 21 of the crankshaft by means of flanged bearings 23, 24 mounted on a journal 22.

The single cam 22 actuates in succession three cylindrical tappets 25 slidably mounted and guided in cavities 26 formed in the front case member 27 of the engine.

Figure 2:
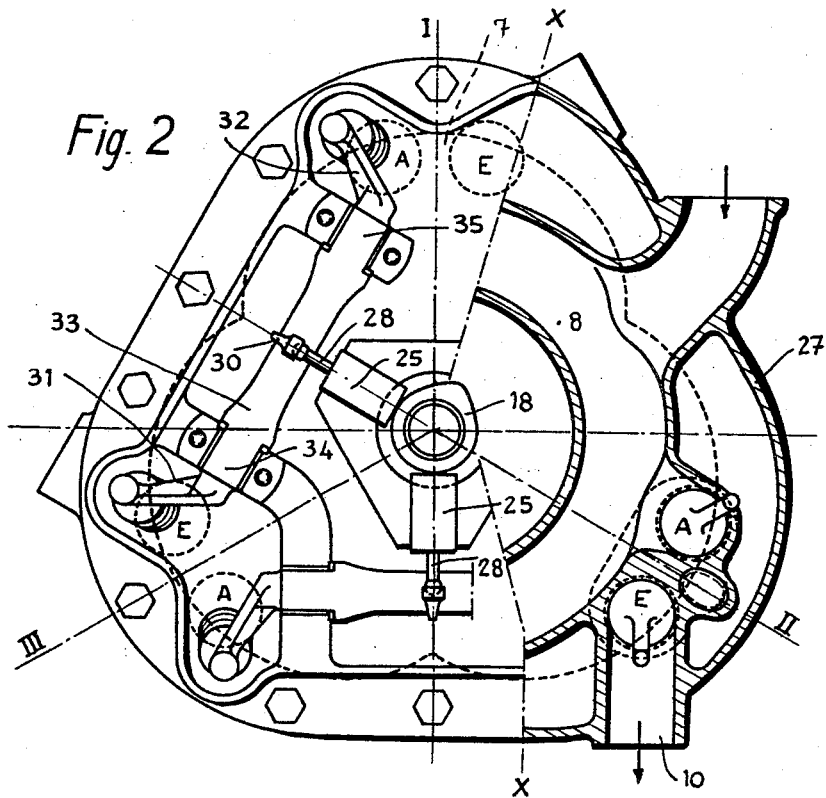
FIGURE 2 is a cross section showing an engine of this type which comprises three working chambers, the portion on the left-hand side of the broken line XX showing the rocker arrangements, and the portion on the right-hand side of this line showing in section the inlet and exhaust passages.

Three rods 28 transmit the movement to three double rockers 29 each comprising a central finger 28 and two arms 31, 32 at the relatively spaced ends of the rocker shaft 33 (see FIG. 2).

Each rocker shaft such as 33 is mounted in two split bearings 34, 35 solid with the main case 27.

Rockers 29 are shifted angularly by 120 degrees from one another, the same applying to the relevant tappets 25.

Figure 3:
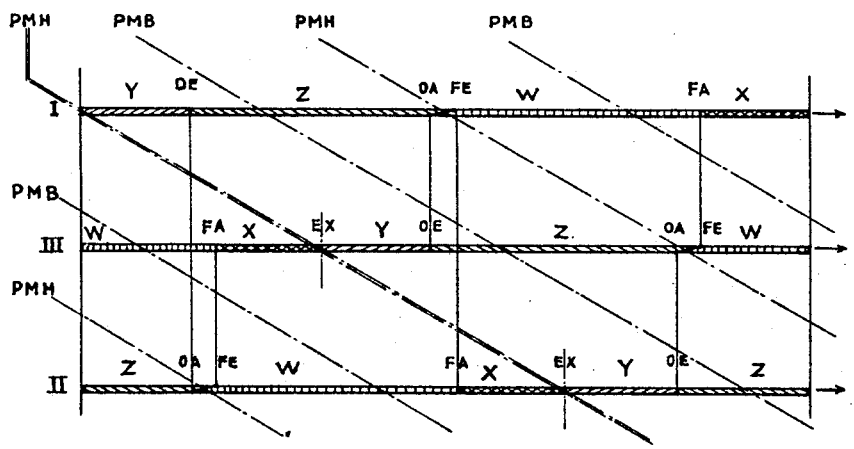
FIGURE 3 is a diagram showing the successive phases of a four-stroke cycle in an engine of this character.

The diagram of FIG. 3 concerning a complete four-stroke cycle of the engine illustrated shows the concordance of the inlet valve opening and of the exhaust valve opening of two adjacent chambers as well as the concordance of the inlet valve closing and exhaust valve closing of one of the two preceding chambers with the third chamber. In this diagram three parallel strips referenced I, III and II indicates respectively as a function of a common abscissa and for each chamber I, III, II the opening and closing OA and A of the inlet valves, and the opening and closing OA and FE of the exhaust valves.

Furthermore, in the same diagram the reference letter W designates the induction, X the compression, Y the expansion and E the exhaust. The top dead centres (PMH) and bottom dead centres (PMB) are situated at the intersections of strips I, III and II with a series of parallel oblique straight lines which in chain-dotted lines and designated alternately by the reference letters PMH and PMB.

Under these conditions, it will be seen for example that the opening of the inlet valve of chamber I is coincident with the opening of the exhaust valve of chamber III and that the closing of the inlet valve of chamber I is coincident with the closing of the exhaust valve of chamber III.

With this arrangement the crossing of valve OA—FE can be effected.

The top dead centres and bottom dead centres are determined by the relative displacements of the crankshaft and rotor. The top dead centre is determined by a position of the crankshaft at the top of its eccentricity, the line of centres of the crankshaft being coincident with the axis of the working chamber concerned and with a position of the rotor of which the greater axis is coincident with this axis.

The bottom dead centre is determined by a position of the crankshaft which is shifted by 180 degrees from the preceding one (PMH) and by rotor position wherein the great axis is at right angle to the above-defined axis.

Of course, many modifications and variations may be brought to the practical embodiment of this invention without however departing from the spirit and scope of the invention as set forth in the appended claims.

I claim:

1. Valve gear of four-stroke rotary-piston explosion engine having a stator formed with three lobes constituting working chambers shifted angularly by 120 degrees from each other about the axis, and a piston-forming rotor formed with two opposite lobes of epicyclic configuration conjugated with that of the stator and revolving eccentrically on a crankshaft revolving at a speed twice that of the rotor but in the opposite direction, characterized in that the inlet and exhaust valves opening in combustion chambers adjacent to the working chamber are controlled by rockers disposed radially at 120 degrees from each other by means of a single cam formed with a single lobe and revolving at the same speed and in the same direction as the rotor.

2. Valve gear according to claim 1, characterized in that said cam is of the disc type and acts upon cylindrical tappets guided in cavities formed in a fixed case member solid with said stator.

3. Valve gear according to claim 1, characterized in that the inlet valve of one chamber is actuated simultaneously with the exhaust valve of an adjacent chamber, the six valves of the engine being mounted to this end to constitute three groups of two valves each on common rocker axes.

No references cited.